Nov. 28, 1967 W. F. MEYERS ET AL 3,355,328
ELECTRIC CURRENT-PRODUCING CELL WITH BUFFER ZONE
Filed Oct. 27, 1964

INVENTORS:
WILLIAM F. MEYERS
DONALD W. KLOPP
BY Howson & Howson
ATTYS.

3,355,328
ELECTRIC CURRENT-PRODUCING CELL WITH BUFFER ZONE

William F. Meyers, Blue Bell, and Donald W. Klopp, North Wales, Pa., assignors, by mesne assignments, to Honeywell Inc., Minneapolis, Minn., a corporation of Delaware
Filed Oct. 27, 1964, Ser. No. 406,798
8 Claims. (Cl. 136—93)

The present invention relates to an improved electric current-producing cell; and, more particularly it relates to an electric current-producing cell utilizing highly active anodes and cathodes in conjunction with protic electrolyte solvents. The invention also relates to a novel method of generating current.

The invention described herein was made in the performance of work under a NASA contract and is subject to the provisions of the National Aeronautics and Space Act of 1958, Public Law 85–568 (72 Stat. 426; 42 U.S.C. 2451), as amended.

Theoretically, it is known that electric current-producing cells having greater power are capable of being produced through the use of very active anode/cathode couples. However, as a practical matter, other actions and reactions which occur render such combinations nonfeasible. Thus, the more active anode metals require acid-free conditions, otherwise they are quickly consumed by corrosion; whereas, on the other hand, the more active cathode materials have greater efficiency under acid conditions. Anode corrosion is markedly influenced by the solvent used, protic solvents being the source of major difficulty. For example, a magnesium anode in a cell utilizing liquid ammonia as the solvent is rapidly attacked by any $NH_4^+$ ions present in the cell. However, when sulfur is used as the cathode material (see U.S. Patent No. 2,996,562) such cathode is much more efficient in the presence of $NH_4^+$ ions (for the cell $Mg/KSCN/NH_3/S:C/Ag$ approximately two times more efficient) than when no $NH_4^+$ ions are present. The anode corrosion problem has been, in the past, partially overcome by the use of massive magnesium anodes. As the large magnesium anode is dissolved in the liquid ammonia, six moles of ammonia are combined with each mol of Mg ($Mg \cdot 6NH_3$) thus consuming large quantities of solvent. The large anode and excess solvent severely limit the high theoretical energy available from this system. Hence, the paradox of anode corrosion in the presence of acid in a protic electrolyte solvent and increased cathode efficiency in the presence of acid has limited the actual production of cell systems to those having low energy density.

It is the principal object of the present invention to provide a novel electric current-producing cell.

Another object of the present invention is to provide an electric current-producing cell system utilizing highly active anode metals while at the same time providing acid conditions at the cathode.

Still another object of the present invention is to provide a novel electric current-producing cell system utilizing highly active anode metals in a non-acid anolyte environment and highly active cathodes in an acid catholyte environment.

A further object of the invention is to provide a cell of the type referred to above in which a protic electrolyte solvent is used.

Other objects, including the provision of a novel method of generating current, will become apparent from a consideration of the following specification and claims.

The present invention comprises, in an electric current-producing cell system involving (1) an anode of an electropositive metal higher in the electrochemical series than zinc; (2) an anolyte in contact with said anode consisting essentially of an electrically-conductive solution, substantially free of hydrogen ions, in a protic solvent and having an electrical conductivity of at least $10^{-3}$ $ohm^{-1}$ $cm.^{-1}$; (3) a depolarizing cathode, and (4) a catholyte in contact with said cathode consisting essentially of an electrically conductive acid solution in a protic solvent, the anion of which acid is at least as low in the electrochemical series as the depolarizer of said depolarizing cathode and said catholyte having an electrical conductivity of at least $10^{-3}$ $ohm^{-1}$ $cm.^{-1}$; the improvement of a buffer zone physically separating said anode and anolyte from said cathode and catholyte, said zone containing an electrically conductive solution of a salt the cation of which is an electropositive metal higher in the electrochemical series than zinc and the anion of which is at least as low in the electrochemical series as said depolarizer, and said zone being bounded, between it and said anolyte by a positive ion-permeable diaphragm containing bound negative groups and between it and said catholyte by a negative ion-permeable diaphragm containing bound positive groups whereby said anolyte is in positive ionic-flow relationship with said buffer zone and said catholyte is in negative ionic-flow relationship with said buffer zone but ion diffusion between said anolyte and said catholyte is substantially negligible.

The present invention will be more readily understood from a consideration of the drawing in which.

Figure 1:
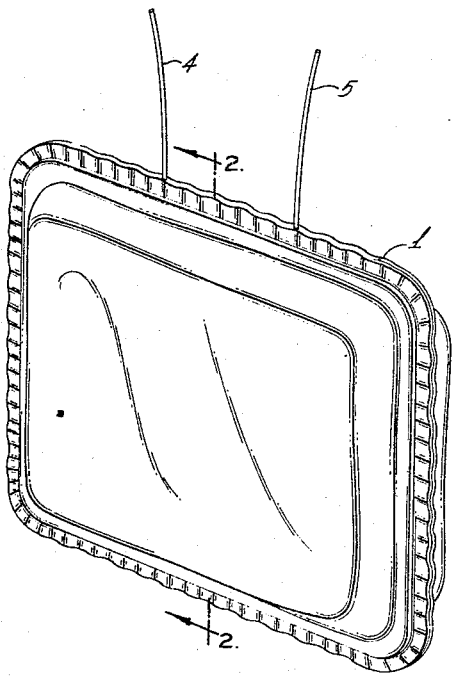
FIGURE 1 is a perspective view, enlarged, of a typical cell of the invention.
Figure 2:
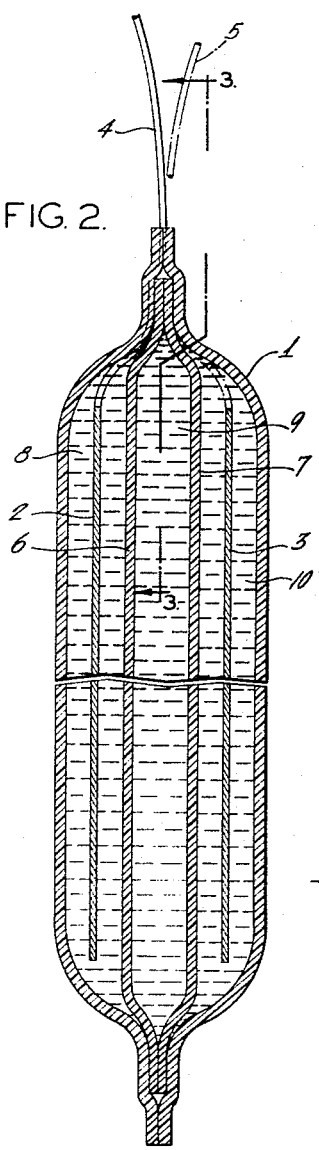
FIGURE 2 is an end elevational view, enlarged and in section, of a cell illustrating the system of the present invention as seen along line 2—2.
Figure 3:
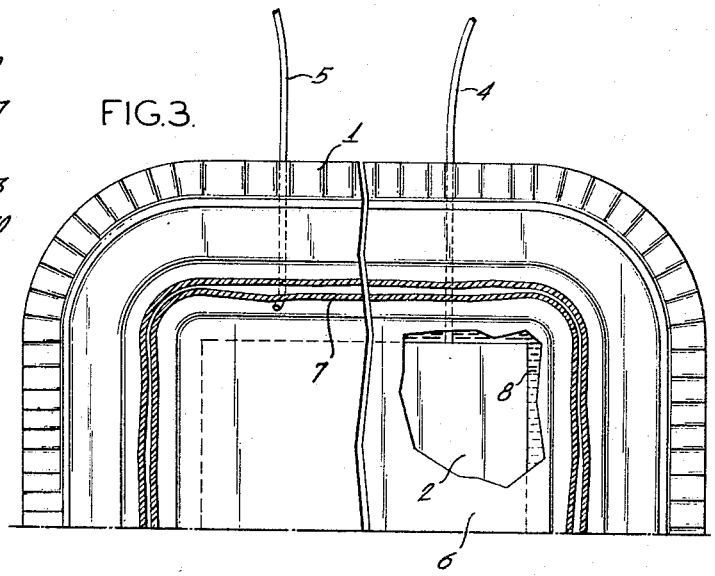
FIGURE 3 is a partial view, partially cut away, of the cell shown in FIGURE 2 as seen along the line 3—3.

The anode of the system will be a strongly active electropositive metal above zinc in the electrochemical series. These metals include the alkali metals (especially sodium, potassium and lithium), the alkaline earth metals (especially calcium and magnesium) aluminum, beryllium, and boron. The stated anode metal may constitute substantially the entire anode structure or the anode metal may be mixed with a less active metal as in an alloy. An anecter, that is a relatively inactive but highly conductive metal like silver, nickel and iron, may be used in contact with the defined anode metal as a means of conducting current from the cell or to a lead wire. This is particularly useful where a material like lithium "bronze," a concentrated solution of lithium in liquid ammonia, is used as anode.

In contact with the anode will be an electrolyte, referred to herein as the anolyte since it functions with the anode and its characteristics are dictated by the function of the anode in the present system. The anolyte must be a conductive solution, having an electrical conductivity of at least $10^{-3}$ $ohm^{-1}$ $cm.^{-1}$, and must be substantially free of hydrogen ions. The solvent will be a protic (protonic) liquid, like water; liquid ammonia; lower fatty alcohols, like methanol, ethanol and propanol; anhydrous lower fatty acids, like formic acid and acetic acid; acetonitrile, liquid, hydrogen cyanide; and the like (see Non-Aqueous Solvents, Audrieth et al., John Wiley & Sons, Inc., New York, 1953, especially page 28, for well known protonic solvents). It is preferable to add to the protic solvent in the anolyte, a small amount of a material which depresses the proton of the solvent; namely, a compound having an anion the same as that of the solvent. A hydroxide is used with water; an amide, imide or nitride with liquid ammonia; a lower fatty alkoxide with a lower fatty alcohol; a lower fatty alkylate with a lower fatty acid; a cyanide with liquid hydrogen cyanide, and so on. The cation is not critical here; however, the alkali metals and alkaline earth metals, particularly those mentioned above in connection with the anode, are preferred.

As stated, the anolyte must be electrically conductive. In many cases, the material added to depress the proton of the solvent will provide the requisite conductivity of at least $10^{-3}$ ohm$^{-1}$ cm.$^{-1}$. This is so, for example, with lithium- or sodium hydroxide in water; sodium cyanide in liquid hydrogen cyanide, and sodium acetate in anhydrous acetic acid. However, in the event the material depressing the proton of the solvent does not provide the requisite conductivity this may be provided through addition of another salt which is soluble and ionizable in the solvent. Thus, many salts, like halides, perchlorates, and so on are useful in water; thiocyanates and perchlorates in liquid ammonia; bromides and chlorides in liquid hydrogen cyanide; chlorides, bromides, iodides, thicoyanates and perchlorates in lower fatty alcohols. Here again the alkali- and alkaline-earth metal salts are preferred, bearing in mind that other cations may, in a particular solvent, provide an undesirable anode environment. For example, ammonium salts are acid in liquid ammonia.

Because the cathode material that enters into the current-producing reactions is not metal, a cathecter will be provided, and this may be any conductive material inert to the catholyte. Materials like carbon, silver and nickel may be used for this purpose.

In contact with the cathecter will be a reactive cathode material ("depolarizer"). Depolarizers suitable for use in various protic solvent systems are known and referred to in the literature (see U.S. Patents 2,863,933; 2,937,219; 2,992,289; 2,996,562; 3,083,252; 2,855,452; 2,976,342; 2,993,946, and 2,597,451). Sulfates of heavy metals above ferrous iron in the electrochemical series, particularly mercuric sulfate, are useful when liquid ammonia is the solvent (see U.S. Patent 2,083,252); nitro- and nitroso-substituted aromatic compounds are useful in water and have also been found to be useful in liquid ammonia (see copending application Ser. No. 317,303 of William L. Harris, filed Oct. 18, 1963), and sulfur is useful in liquid ammonia (see U.S. Patent 2,996,562). Fluorides, like cupric-, cobaltic- and nickelous-fluorides and oxides, like lead dioxode, manganese dioxide and silver oxide, are useful. Chlorine is suitable in water and this may be formed in situ as by reaction between hydrochloric acid and a hypochlorite.

The greater the Faradays and potential provided by the depolarizer the greater the energy provided per weight of depolarizer. While high energy density is not a necessity of the present cell, nevertheless the present cell system makes possible cells of high energy-density. Where extremely high energy-density is desired, such as at least 200 watt hours/lb., the depolarizer will provide more than 0.01 Faraday per gram and will have a potential in the catholyte of at least the difference between 2.2 and the potential of the anode metal in its anolyte. These characteristics are either already available in the literature or can be measured by well known means.

In contact with the depolarizing cathode will be an electrolyte, referred to in this case as the catholyte. The catholyte must also be an electrically conductive solution, in a protic solvent, having an electrical conductivity of at least $10^{-3}$ ohm$^{-1}$ cm.$^{-1}$; and will be acid, that is will contain substantial hydrogen ions. Any acid soluble in the catholyte solvent and having an anion at least as low in the electrochemical series as the depolarizer may be used. When liquid ammonia is used as catholyte solvent, ammonium salts like the chloride, bromide, nitrate, thiocyanate and perchlorate, are acids. Ammonium thiocyanate and ammonium perchlorate are preferred. Water also provides ammonium ions in liquid ammonia and, therefore, is an acid in that solvent. Common inorganic and organic acids like hydrochloric, nitric, sulfuric, perchloric, fluoboric, acetic acid, dichloroacetic acid, picric acid, and the like, may be used with water and with other protic solvents so long as there is sufficient solubility to render the solution on the acid side of the neutrality in which the solvent exists in its pure state. When the solvent is an anhydrous acid, like formic or acetic acid, a stronger acid, like hydrochloric, hydrobromic or sulfuric, should be used. When possible, it is preferred that the anion of the acid used be the same as that of the depolarizer.

As stated, the catholyte must also be electrically conductive, with a conductivity of at least $10^{-3}$ ohm$^{-1}$ cm.$^{-1}$. In many cases, the acid added may provide the requisite conductivity; when it doesn't, a salt may be added for this purpose. The anion of the salt so added should be at least as low in the electrochemical series as the depolarizer and preferably is the same as that of the depolarizer.

In accordance with the present invention, the anode and anolyte are physically separated from the cathode and catholyte by a buffer zone. This buffer zone will be separated from the anolyte by a positive ion-permeable diaphragm containing bound negative groups, and will be separated from the catholyte by a negative ion-permeable diaphragm containing bound positive groups. Within the buffer zone will be an electrically conductive solution, in a protic solvent, of a salt the cation of which is an electropositive metal higher in the electrochemical series than zinc, such as those mentioned above in connection with the anode, and the anion of which is at least as low in the electrochemical series as the depolarizer. Thus, in operation of the cell, the positive metal ions from the anolyte can migrate through the diaphragm separating the anolyte and the buffer zone, and the anions in the catholyte can migrate through the diaphragm separating the catholyte and the buffer zone. However, ion diffusion between the anolyte and the catholyte is substantially negligible, so that migration of acidity from the catholyte to the anolyte and of alkalinity from the anolyte to the catholyte is minimized. In a sense, the buffer zone serves as a "dump" where products resulting from the electrochemical reactions may go, combine and become isolated from the anolyte and catholyte, respectively.

With respect to the positive ion-permeable diaphragm separating the buffer zone and the anolyte, this may be a cation exchange resin membrane, such as one containing sulfonic acid groups or carboxylic acid groups. Those containing sulfonic acid groups may be prepared by sulfonating a copolymer of monovinyl aryl compound, like styrene, and a polyolefinic compound, like divinyl benzene. Those containing carboxylic acid groups may be prepared by reacting a monovinyl aryl compound containing carboxylic acid or ester groups with a polyolefinic compound and hydrolyzing when carboxylic ester groups are present. The entire membrane may be made up of the cation exchange resin (e.g. "homogeneous") as by casting the resin as a thin film, or the membrane may be prepared by forming the cation exchange resin on a substrate (e.g. "heterogeneous"), like a woven nylon fabric (cloth or mesh). Cation exchange membranes are well known, and are discussed in U.S. Patents 2,891,014; 2,891,015; 2,894,917 and 2,898,311 to which reference may be made. Reference may also be made to Ion Exchange, Helferrich, McGraw-Hill Book Company, Inc., 1962.

The negative ion-permeable diaphragm separating the buffer zone and the catholyte may be an anion exchange resin membrane, such as those containing quaternary ammonium groups or amine groups. These may be prepared by quaternizing or aminating a copolymer of a monovinyl aryl compound, like styrene, and a polyolefinic compound, like divinyl benzene. The entire membrance may be made up of the anion exchange resin ("homogeneous" type) or the membrane may be prepared by forming the anion exchange resin on a substrate ("heterogeneous" type) like woven nylon fabric (cloth or mesh). Anion exchange resin membranes are well known, and are discussed in U.S. Patents 2,864,776 and 2,883,349 to which reference may be made. Reference may also be made to Ion Exchange cited above.

Reference has been made above to the use of a protic solvent in the anolyte, catholyte and buffer zone. The same solvent may be used in all three zones; however, this is not critical and different solvents may be used in different zones.

Referring then to the drawings, 1 represents the cell chamber which may be of any suitable structural material inert to the electrolytes involved. As shown in the drawing, the cell chamber may be in the form of a thermoplastic bag, such as of polyethylene. However, it will be apparent that the particular shape and construction of the cell, as well as the material from which the cell chamber is made, may vary widely. The numeral 2 represents the anode and 3 represents the depolarizing cathode including the depolarizer and cathecter. Suitable lead wires 4 and 5 are attached to the anode and cathode, respectively. Numeral 6 represents the positive ion-permeable diaphragm which separates anolyte 8 from buffer zone 9. Numeral 7 represents the negative ion-permeable diaphragm which separates catholyte 10 from buffer zone 9. Membranes 6 and 7 may be held in place as shown by a suitable adhesive or by heat sealing. With the elements of the cell in place of cell chamber may be closed, as by heat sealing.

The following examples are given for the purpose of illustration and are not intended to limit the scope of the invention in any way.

*Example I*

A U-tube cell is constructed from two glass elbows joined through an inverted glass T. A magnesium rod is inserted down into one leg of the U to serve as anode and a lead wire is attached thereto. A carbon rod is inserted down into the other leg of the U to serve as cathecter and a lead wire is attached thereto. Between the elbow serving as anode section and the connecting T is placed a strong acid cation exchange resin membrane, which is a sulfonated copolymer prepared by cross-linking polystyrene with divinyl benzene grafted onto nylon mesh. Between the elbow serving as the cathode section and the connecting T is placed a strong base anion exchange resin membrane, which is a quaternized copolymer prepared by cross-linking polystyrene with divinyl benzene grafted onto nylon mesh. The anode section is filled with a 1 molar solution of magnesium perchlorate in saturated aqueous magnesium hydroxide. The cathode section is filled with a 1 molar aqueous solution of hydrochloric acid saturated with chlorine (i.e. containing excess calcium hypochlorite which reacts with the HCl to produce chlorine). The middle section, or buffer zone, is filled with a 1 molar aqueous solution of magnesium chloride.

With the cell at room temperature and the circuit completed, the potential was measured at different times both under a load of 2000 ohms and under no-load (open circuit) conditions. The results are tabulated as follows:

| Elapsed time (hrs.) | Potential under load (volts) | Potential-open circuit (volts) |
| --- | --- | --- |
| 0 | 2.0 | 2.8 |
| .25 | 2.0 | 2.7 |
| .50 | 2.0 | 2.5 |
| .75 | 2.2 | 2.5 |
| 6.25 | 2.3 | 2.5 |
| 12.00 | 1.6 | 2.5 |
| 20.50 | 1.6 | 2.5 |

*Example II*

A cell, similar in construction to that shown in the drawing, is prepared in which, however, the thermoplastic film (polyethylene) adjacent the cathecter (described below) is additionally heat sealed around the periphery of the cathecter, except for a lower corner, to form a pocket between the cathecter and the outer plastic wall. The anode is magnesium (1.5" x 1.5" x 0.16"); the anolyte is 4 cc. of 4 N magnesium perchlorate in a saturated aqueous solution of magnesium hydroxide; the catholyte is 5 g. of a 50%, by weight, aqueous solution of HCl; the solution in the buffer zone is 1 cc. of a 4 N aqueous solution of magnesium chloride, and the membranes separating the buffer zone from the anolyte and catholyte, respectively, are the same as in Example I.

The cathecter is a porous carbon sheet, the inner surface (in contact with the HCl solution) is coated with polytetrafluoroethylene ("Teflon") to prevent penetration by the HCl solution. As stated, the polyethylene film adjacent the cathecter is heat sealed around the periphery of the cathecter except for one corner, to form a pocket. In this pocket is packed 2.5 g. of calcium hypochlorite. HCl solution flowing through the unsealed area reacts with the calcium hypochlorite to form chlorine. The pressure of the generated chlorine gas retards further flow of HCl solution until chlorine is consumed, reducing the pressure and permitting additional flow of HCl solution into the pocket for reaction with calcium hypochlorite and generation of chlorine.

With lead wires attached to the magnesium anode and carbon cathecter and the circuit completed at room temperature, the cell has an operating voltage of about 2.6 volts and a capacity of about 1.5 ampere hours.

*Example III*

In this example, a cell is constructed as shown in the drawings. The cell chamber is polyethylene film; the anode is magnesium (1.5" x 1.5" x 0.16"); the anolyte is 4 cc. of 4 N magnesium perchlorate in a saturated aqueous solution of magnesium hydroxide; the catholyte is 7 cc. of 20 N $H_2SO_4$ in water; the solution in the buffer zone is 1 cc. of a saturated aqueous solution of magnesium sulfate, and the membranes separating the buffer zone from the anolyte and catholyte, respectively, are the same as in Example I.

The cathode is prepared by mixing 80 parts, by weight, of manganese dioxide, 15 parts of carbon and 5 parts of paper fibers with water and filtering through a fine silver mesh (expanded type to provide a gross mesh thickness of about 5 mils, diamond-shaped openings of about 0.015", and strand width of about 0.005"). The resulting sheet of cathode material (weighing 4 g.) adheres to the silver mesh which serves as a cathecter.

With lead wires attached to the magnesium anode and silver mesh cathecter and the circuit completed at room temperature, the cell has an operating voltage of about 2.5 volts and a capacity of about 1.5 ampere hours.

Modification is possible in the selection of materials, amounts thereof and deployment thereof in constructing cells without departing from the scope of the invention.

We claim:

1. In an electric current-producing cell system involving: (1) an anode of an electropositive metal higher in the electrochemical series than zinc; (2) an anolyte in contact with said anode consisting essentially of an electrically-conductive solution, substantially free of hydrogen ions, in a protic solvent and having an electrical conductivity of at least $10^{-3}$ ohm$^{-1}$ cm.$^{-1}$; (3) a depolarizing cathode, and (4) a catholyte in contact with said cathode consisting essentially of an electrically conductive acid solution in a protic solvent, the anion of which acid is at least as low in the electrochemical series as the depolarizer of said depolarizing cathode and said catholyte having an electrical conductivity of at least $10^{-3}$ ohm$^{-1}$ cm.$^{-1}$; the improvement of a buffer zone physically separating said anode and anolyte from said cathode and catholyte, said zone containing an electrically conductive solution of a salt the cation of which is an electropositive metal higher in the electrochemical series than zinc and the anion of which is at least as low in the electrochemical series as said depolarizer, and said zone being bounded, between it and said anolyte by a positive ion-permeable diaphragm containing bound negative groups and between it and said catholyte by a negative ion-permeable diaphragm containing bound positive groups whereby said anolyte is in positive ionic-flow relationship with said buffer zone and said catholyte is in negative ionic-flow relationship with said buffer zone but ion diffusion between said anolyte and said catholyte is substantially negligible.

2. The cell of claim 1 wherein the electrically-conductive solution in said buffer zone is in a protic solvent.

3. The cell of claim 1 wherein said positive ion-permeable diaphagm is a cation exchange resin.

4. The cell of claim 3 wherein said cation exchange resin contains sulfonic acid groups.

5. The cell of claim 1 wherein said negative ion-permeable diaphragm is an anion exchange resin.

6. The cell of claim 5 wherein said anion exchange resin contains quaternary ammonium groups.

7. The cell of claim 1 wherein said positive ion-permeable diaphragm is a cation exchange resin, and wherein said negative ion-permeable diaphragm is an anion exchange resin.

8. The cell of claim 7 wherein said cation exchange resin contains sulfonic acid groups, and wherein said anion exchange resin contains quaternary ammonium groups.

References Cited

UNITED STATES PATENTS

| | | | |
|---|---|---|---|
| 3,174,880 | 3/1965 | Buitkus | 136—83 |
| 3,189,485 | 6/1965 | Panzer | 136—93 |

WINSTON A. DOUGLAS, *Primary Examiner.*

A. SKAPARS, *Assistant Examiner.*